US012149122B2

United States Patent
Velly et al.

(10) Patent No.: US 12,149,122 B2
(45) Date of Patent: Nov. 19, 2024

(54) STATOR FOR ROTARY ELECTRIC MACHINE AND ASSOCIATED ROTARY ELECTRIC MACHINE

(71) Applicant: GE Energy Power Conversion Technology Limited, Warwickshire (GB)

(72) Inventors: Nicolas Velly, Frouard (FR); Tristan Dontenville, Champigneulles (FR); Christophe Galmiche, Toul (FR); Clement Biri, Champigneulles (FR); Lionel Durantay, Frouard (FR); Federico Svetti, Champigneulles (FR)

(73) Assignee: GE Energy Power Conversion Tehcnology Limited, Warwickshire (GB)

( * ) Notice: Subject to any disclaimer, the term of this patent is extended or adjusted under 35 U.S.C. 154(b) by 931 days.

(21) Appl. No.: 17/144,407

(22) Filed: Jan. 8, 2021

(65) Prior Publication Data
US 2021/0211000 A1 Jul. 8, 2021

(30) Foreign Application Priority Data

Jan. 8, 2020 (EP) .................................... 20315003

(51) Int. Cl.
*H02K 1/20* (2006.01)
*H02K 9/19* (2006.01)

(52) U.S. Cl.
CPC ................. *H02K 1/20* (2013.01); *H02K 9/19* (2013.01)

(58) Field of Classification Search
CPC ............ H02K 1/20; H02K 5/20; H02K 5/203; H02K 5/207
See application file for complete search history.

(56) References Cited

U.S. PATENT DOCUMENTS 9,831,746 B2 11/2017 Maki-Ontto et al.
10,243,419 B2 3/2019 Gugel
(Continued)

FOREIGN PATENT DOCUMENTS

DE 102007021723 A1 * 11/2008 ............... H02K 9/18
EP 2 975 734 A2 1/2016
(Continued)

OTHER PUBLICATIONS

Seibicke (DE 102007021723 A1) English Translation (Year: 2008).*

*Primary Examiner* — Tulsidas C Patel
*Assistant Examiner* — Robert E Mates
(74) *Attorney, Agent, or Firm* — WOOD IP LLC (57) ABSTRACT

The stator for rotary electric machine comprises a stator frame and a cylindrical magnetic mass inserted in the stator frame, the magnetic mass including a plurality of stacks of compacted magnetic sheets and longitudinal channels uniformly distributed over at least one diameter of the magnetic mass, the channels leading to each side of the magnetic mass.
At least three bundles of compacted magnetic sheets are separated by spacers forming two discharge pipes extending circumferentially and radially between the stator frame and a central housing of the stator intended to receive a rotor of the rotary electric machine and communicating with the channels, the stator frame comprising at least two discharge openings connected to different pipes such that a fluid injected on either side of the magnetic mass escapes from the stator via the discharge pipes, the fluid passage section of the discharge pipes being configured to modify the temperature distribution in the magnetic mass.

12 Claims, 7 Drawing Sheets

(56) References Cited

U.S. PATENT DOCUMENTS

| | | | |
|---|---|---|---|
| 2013/0033148 A1 | 2/2013 | Vetter et al. | |
| 2015/0288231 A1* | 10/2015 | Jahnz et al. | |
| 2017/0163125 A1* | 6/2017 | Granat | H02K 9/18 |
| 2017/0324289 A1* | 11/2017 | Yogo | H02K 1/28 |
| 2018/0054096 A1 | 2/2018 | Dlala | |
| 2019/0229566 A1 | 7/2019 | Oechslen | |

FOREIGN PATENT DOCUMENTS

| | | |
|---|---|---|
| JP | 2007116792 A | 5/2007 |
| JP | 2011175009 A | 9/2011 |
| JP | 4864492 B2 | 2/2012 |
| WO | 03/012955 A1 | 2/2003 |
| WO | 2015153081 A1 | 10/2015 |

* cited by examiner

STATOR FOR ROTARY ELECTRIC MACHINE AND ASSOCIATED ROTARY ELECTRIC MACHINE

FIELD OF TECHNOLOGY

The present invention relates to bilaterally cooled stators.

The present invention also relates to a rotary electric machine comprising such a stator and an integrated compressor unit comprising such a rotary electric machine.

BACKGROUND

Figure 1:
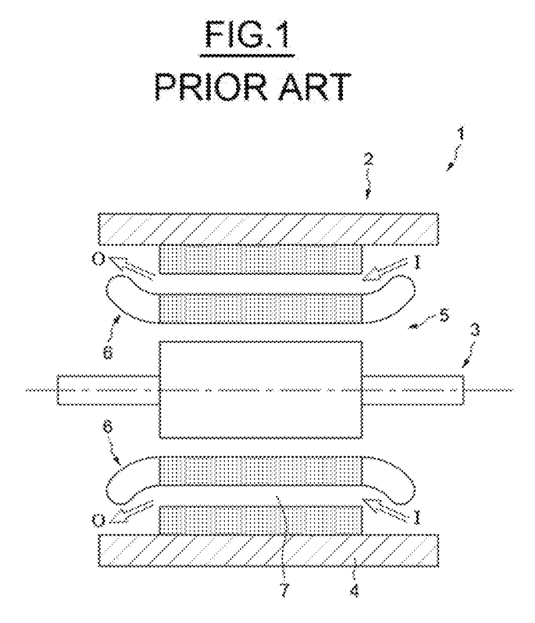
FIG. 1, which has already been mentioned, illustrates a rotary electric machine according to the prior art.

FIG. 1 illustrates a rotary electric machine 1 unilaterally cooled according to the prior art.

The machine 1 comprises a stator 2 wherein a rotor 3 is inserted.

The stator 2 comprises a frame 4 housing a magnetic mass 5 formed by compacted magnetic sheets. Coils 6 are inserted into notches of the magnetic mass 5.

According to the operating mode of the rotary electric machine, the electrical or mechanical power generated is degraded by the heating of the coils 6.

In order to improve said power, it is necessary to cool the magnetic mass 5 and consequently the coils 6.

The magnetic mass comprises longitudinal channels 7 wherein a coolant circulates, for example a liquid or a gas.

The fluid is injected into a first end I of the stator, and circulates in the air gap of the machine 1 and in the channels 7.

As the fluid progresses into the magnetic mass 5, the fluid heats up and leaves a second end O of the stator.

However, the heated fluid no longer sufficiently cools the second end O such that at least one hot spot appears in the magnetic mass 5 and heats the heads of the coils 6 located at the second end, degrading the efficiency of the rotary electric machine.

Document U.S. Pat. No. 9,831,746 discloses a stator comprising a magnetic mass traversed by longitudinal channels connected to a radial or central channel.

A coolant is injected into the central channel in order to cool the magnetic mass.

However, according to the length of the stator, the supply of the longitudinal channels by a single radial or central channel is not sufficient for maintaining the temperature of the magnetic mass at an acceptable value to improve the performances of the rotary electric machine.

Document US 2015/0288231 discloses a stator comprising a magnetic mass traversed by longitudinal channels connected to a radial channel.

A fluid is injected on either side of the magnetic mass and flows out of the stator via the radial channel.

However, such a configuration does not make it possible to accurately regulate the distribution of the temperature within the magnetic mass.

Reference can also be made to documents JP 4864492 and JP 2011-175009 that disclose a stator comprising a magnetic mass whereof the outer periphery is cooled.

Such a configuration also does not make it possible to accurately regulate the distribution of the temperature within the magnetic mass.

Document JP 2007-116792 discloses a stator including compacted magnetic sheets forming bundles of sheets separated by pipes configured to circulate a fluid.

However, such a configuration also does not make it possible to accurately regulate the distribution of the temperature.

Furthermore, the passage sections of the fluid of the stator are fixed and dimensioned for nominal operation of the rotary machine such that if the operating conditions of the electric machine are modified such as the rotational speed or the modification of the features of the coolant circulating in the stator, it is difficult to adapt the cooling capacity of the rotary electric machine.

It is therefore proposed to overcome all or part of the drawbacks of the stators according to the prior art, in particular by improving the regulation of the temperature of the stator independently of the features of the fluid circulating in the stator.

SUMMARY

In view of the foregoing, a stator for rotary electric machine comprising a stator frame and a cylindrical magnetic mass inserted in the stator frame is proposed, the magnetic mass including a plurality of stacks of compacted magnetic sheets and longitudinal channels uniformly distributed over at least one diameter of the magnetic mass, the channels leading to each side of the magnetic mass.

At least three bundles of compacted magnetic sheets are separated by spacers forming two discharge pipes extending circumferentially and radially between the stator frame and a central housing of the stator intended to receive a rotor of the rotary electric machine and communicating with the channels, the stator frame comprising at least two discharge openings connected to different pipes such that a fluid injected on either side of the magnetic mass escapes from the stator via the discharge pipes, the fluid passage section of the discharge pipes being configured to modify the temperature distribution in the magnetic mass.

According to one feature, each pipe is connected to a plurality of openings disposed over a diameter of the stator frame.

Preferably, the openings are distributed according to at least one generator of the stator frame.

Advantageously, the generators are uniformly disposed over a diameter of the stator frame.

According to another feature, the thickness of at least one bundle of magnetic sheets is different from the thickness of the other bundles of magnetic sheets.

Advantageously, the spacers are of different sizes such that the discharge pipes are of different sizes, each opening being substantially equal to or greater than the section of the discharge pipe connected to said opening.

Preferably, the magnetic mass further comprises at least one longitudinal groove leading to an outer surface area of the magnetic mass, said groove being configured to channel the fluid from the discharge pipes to the openings.

Also according to another feature, the stator further comprises at least one manifold having branches connected to the different openings disposed on the same generator of the stator frame, the fluid passage surface area of each branch being substantially equal to or greater than the fluid passage surface area of the opening connected to said branch, each branch comprising a first regulation means configured to control the fluid flow rate flowing through said branch and the manifold comprising an outlet for discharging the fluid from the stator.

Advantageously, the stator comprises at least one first collecting chamber extending in a longitudinal direction and collecting the fluid flowing through each opening disposed according to the same generator of the magnetic mass, the first collecting chamber comprising an outlet for discharging the fluid out of the stator and a first regulation means configured to control the fluid flow rate circulating through said outlet.

Preferably, the stator comprises a second collecting chamber encompassing the stator frame and configured to collect the fluid flowing through each opening, the second chamber comprising at least one outlet for discharging the fluid out of the stator.

Advantageously, each opening is connected to the second collecting chamber via a first regulation means configured to control the fluid flow rate circulating through said opening.

Also according to another feature, the second collecting chamber comprises at least one second outlet and a second regulation means configured to control the fluid flow rate circulating through the second outlet.

Preferably, the first regulation means and if applicable the second regulation means each comprise a control valve or a fluid passage section calibrated at a predetermined value for a predetermined pressure or a predetermined temperature.

According to another aspect, it is proposed a rotary electric machine comprising a stator such as previously defined.

Also according to another aspect, it is proposed an integrated compressor unit comprising a sealed casing containing a compression section and a rotary electric machine such as previously defined and driving the compression section.

BRIEF DESCRIPTION OF THE DRAWINGS

Other features and advantages of the invention will become apparent upon reading the following description of embodiments of the invention, given only by way of non-limiting examples and with reference to the drawings wherein.

DETAILED DESCRIPTION

Figure 2:
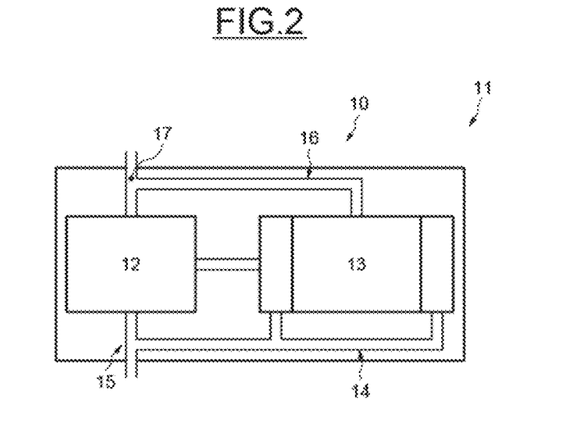
FIG. 2 illustrates an example of embodiment of an integrated compressor unit.

Reference is made to FIG. 2 that illustrates a longitudinal half-shell of an example of integrated compressor unit 10 comprising a sealed casing 11 containing a compression section 12 and a rotary electric machine 13 driving the compression section 12.

The rotary electric machine 13 is cooled by cooling means 14 diffusing a fluid into the electric machine 13 for providing bilateral type cooling.

The fluid supplying the means 14 is for example taken at an outlet 15 of the compression section 12, for example at the outlet of the first compression wheel.

The fluid is for example a gas or a liquid.

The electric machine 13 comprises an outlet 16 for discharging the fluid injected by the cooling means 14 at the two ends of the machine 13.

The outlet 16 may be connected to an inlet 17 of the compression section 12, for example to the inlet of the first compression wheel.

The temperature of a stator 18 of the rotary electric machine 13, is regulated by the injection of a fraction of the fluid entering the compression section 12 so as to control the temperature of at least one hot spot of the stator 18 generally located in a central area of the stator.

Alternatively, the temperature of the stator 18 of the rotary electric machine 13 is regulated by the injection of a fluid coming from a fluid source external to the compression section 12.

Figure 3:
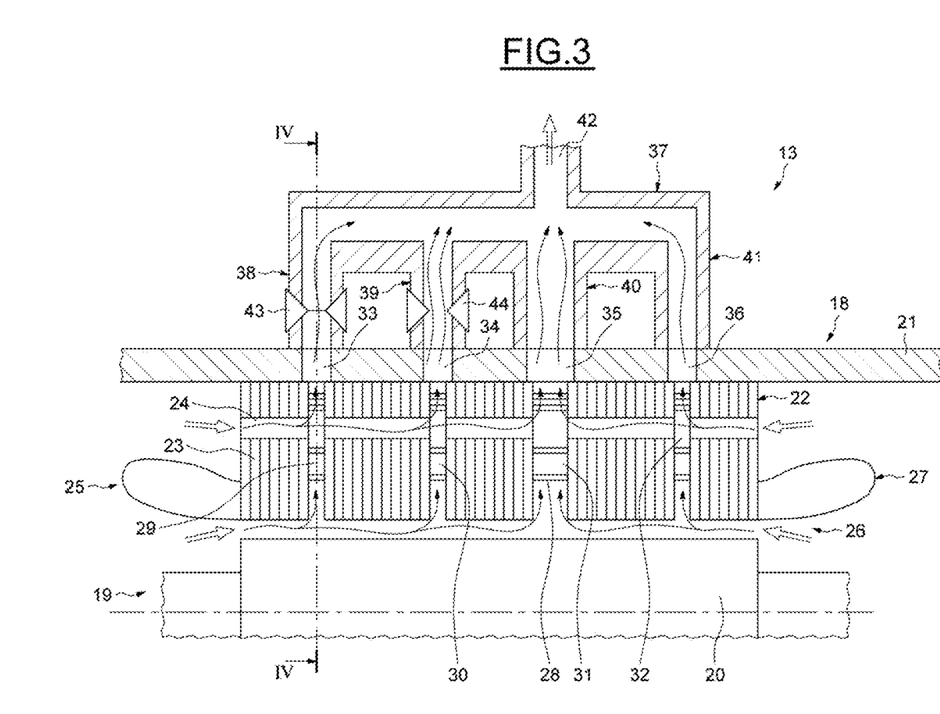
FIGS. 3 and 4 illustrate a first embodiment of a rotary electric machine.
Figure 4:
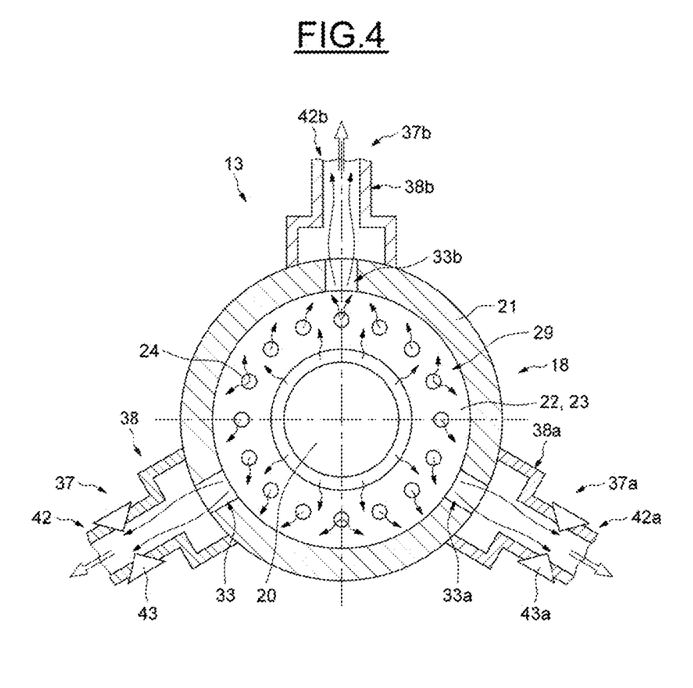

FIGS. 3 and 4 illustrate a longitudinal section and a cross-section in the IV-IV direction of a first embodiment of the rotary electric machine 13.

The electric machine 13 comprises a stator 18 comprising a central housing 19 housing a rotor 20 of the machine 13.

The stator 18 comprises a stator frame 21 and a cylindrical magnetic mass 22 inserted in the stator frame 21.

The magnetic mass 22 includes a plurality of stacks of compacted magnetic sheets 23 and longitudinal channels 24 uniformly distributed over at least one diameter of the magnetic mass 22, the channels leading to each side 25 and 26 of the magnetic mass 22.

The magnetic sheets 23 may further include notches wherein stator coils 27 are inserted.

Bundles of magnetic sheets 23 are separated by spacers 28 to form discharge pipes 29, 30, 31 and 32 extending circumferentially and radially between the stator frame 21 and the central housing 19 of the stator 18.

The spacers 28 are for example pins.

The bundles of sheets may be of the same thickness or different thicknesses.

The discharge pipes 29, 30, 31 and 32 communicate with the longitudinal channels 24.

Although four discharge pipes are shown, it is sufficient that the stator 18 includes at least two discharge pipes.

The stator frame 21 comprises discharge openings 33, 34, 35 and 36 connected respectively to different discharge pipes 29, 30, 31, 32 such that the fluid injected by the means 14 on either side of the magnetic mass 22 (shown by solid arrows) escapes from the stator 18 via the discharge pipes 29, 30, 31 and 32, the fluid circulating in the air gap of the electric machine 13, in the longitudinal channels 24 and the discharge pipes 29, 30, 31, 32.

The fluid passage section of the discharge pipes 29, 30, 31, 32 is chosen so as to modify the temperature distribution in the magnetic mass 22.

The section of the discharge pipes 29, 30, 31, 32 is chosen for example so that the temperature within the magnetic mass is substantially uniform at the nominal speed of the electric machine 13 in order to reduce the temperature of at least one hot spot of the stator 18 generally located in the central area of the stator 18.

Each pipe 29, 30, 31 and 32 may be connected to a plurality of openings 33, 34, 35 and 36 disposed over a diameter of the stator frame 21.

The openings 33, 34, 35 and 36 are distributed on the same generator of the magnetic mass 22 and may be of identical or different section.

Alternatively, the openings 33, 34, 35 and 36 are distributed on a plurality of generators disposed for example uniformly over a diameter of the stator frame 21.

The spacers 28 are of different sizes such that the discharge pipes 29, 30, 31 and 32 are of different sizes.

Each opening 33, 34, 35 and 36 is substantially equal to or greater than the section of the discharge pipe connected to said opening 33, 34, 35 and 36.

The stator 18 further comprises a manifold 37.

The branches 38, 39, 40 and 41 of the manifold 37 are connected to different respective openings 33, 34, 35 and 36.

The passage surface area of the fluid of each branch 38, 39, 40 and 41 is substantially equal to or greater than the passage surface area of the fluid of the opening connected to said branch 38, 39, 40 and 41.

The manifold 37 comprises an outlet 42 for discharging the fluid from the stator 18.

Each branch 38, 39, 40 and 41 comprises a first regulation means configured to control the fluid flow rate flowing through said branch 38, 39, 40 and 41.

Each first regulation means may comprise a control valve or fluid passage section calibrated at a predetermined value for example for a predetermined pressure or a predetermined temperature.

For example, first and second branches 38 and 39 each comprise a control valve 43, 44, and the third and fourth branches 40 and 41 each comprise a calibrated fluid passage section.

Depending on the nature of the fluid entering the compression section 12, the modification of the fluid passage sections of the valves 43 and 44 make it possible to adapt the temperature distribution in the stator 18, for example in order to limit the amplitude of the hot spots within the magnetic mass so as to limit the heating of the coils in order to increase the efficiency of the rotary electric machine.

Furthermore, if the fluid flow rate injected by the cooling means 14 is not identical on either side of the stator, the valves 43 and 44 make it possible to balance the flow rates injected by the means 14.

In addition, when the integrated compressor unit (i.e. the compression section 12) is used to compress a fluid extracted for example from a gas field, according to the gas depth and the season, the features of the fluid fluctuate such as the temperature, the pressure and the composition of the fluid. As the stator is for example cooled by a fraction of the fluid leaving the compression section 12, the fluid passage sections of the branches 38 to 41 make it possible to take into account the modification of the fluid in order to provide in particular an optimum cooling of the stator 18.

When at least one of the branches 38 to 41 is equipped with a control valve 43, 44, according to the electrical power level produced by the rotary electric machine, the cooling power is adapted in real time making it possible to reduce the fraction of fluid taken at the outlet 42 and the fraction of hot fluid injected at the inlet 17 of the compressor section 12 so as to increase the efficiency of the compressor section 12.

In this embodiment, the stator 18 further comprises a second and a third manifold 37a and 37b (visible in FIG. 4) whereof the branches 38a and 38b are connected to openings 33a and 33b located in the same plane as the opening 33.

The manifolds 37a and 37b comprise an outlet 42a, 42b for discharging the fluid out of the stator 18.

When there are generators present, the manifolds 37a and 37b are connected to a plurality of openings located on the same generator as the openings 33a and 33b.

The branch 38a of the second manifold 37a comprises a second control valve 43a and the branch 38b of the third manifold 37b comprises a fluid passage section calibrated at a predetermined value for example for a predetermined pressure and a predetermined temperature.

Alternatively, the manifolds 37, 37a and 37b are each replaced by a first collecting chamber extending along the generator whereon are disposed the openings and collecting the fluid flowing through each opening. This chamber is disposed according to the generator of the stator yoke.

According to another alternative, the manifolds 37, 37a and 37b are each replaced by at least two first collecting chambers identical or not extending along the generator whereon are disposed the openings and collecting the fluid flowing through each opening, each of the first chambers collecting the fluid of at least one opening, the number of openings connected to each of the first chambers being identical or not. The first chambers are disposed according to the generator of the stator yoke.

Each first collecting chamber comprises an outlet for discharging the fluid out of the stator and a first regulation means configured to control the fluid flow rate circulating through said outlet.

Figure 5:
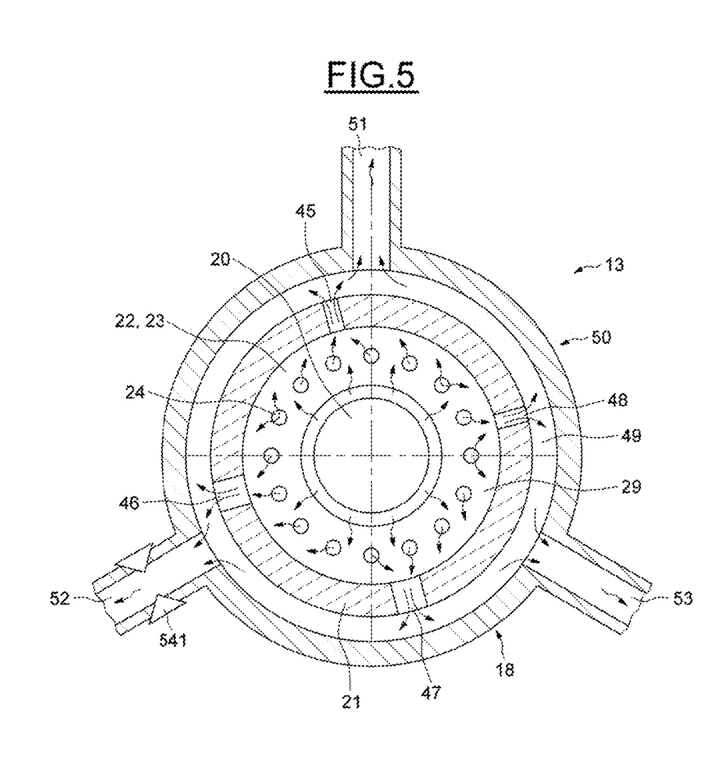
FIG. 5 illustrates a second embodiment of the rotary electric machine.

FIG. 5 illustrates a radial section in the IV-IV direction of a second embodiment of the rotary electric machine 13.

It shows the stator 18 comprising the stator frame 21, the magnetic mass 22 comprising the longitudinal channels 24, and the rotor 20.

The stator 18 differs from the stator illustrated in FIGS. 3 and 4 in that it comprises four discharge openings 45, 46, 47 and 48 connected to each discharge pipe 29, and a second collecting chamber 50 encompassing the frame 21 and collecting the fluid flowing through each opening 45 to 48.

The space between the stator frame 21 and the second collecting chamber 50 forms a flow line 49.

The openings may be of identical or different section.

The second collecting chamber 50 comprises for example three outlets 51 to 53 for discharging the fluid out of the stator 18.

Alternatively, the second collecting chamber 50 may comprise a single outlet, two outlets or more than three outlets.

Alternatively, the stator 18 comprises as many second collecting chambers as flow lines such that the openings communicating with a flow line are each connected to one of the second collecting chambers.

Each outlet 51, 52 and 53 comprises a second regulation means for controlling the fluid flow rate circulating through said second outlet, the second regulation means comprising a control valve or a fluid passage section calibrated at a predetermined value for example for a predetermined pressure or a predetermined temperature.

For example, first and third outlets 51, 52 and 53 comprise a fluid passage section calibrated at a predetermined value for a predetermined pressure and a predetermined temperature, and the second outlet 52 comprises a control valve 541, the passage sections of the outlets 51 and 53 able to be identical or different.

As described previously, the calibrated sections and the control valve 541 make it possible to modify the distribution of the temperature profile in the magnetic mass, for example in the circumferential direction.

Figure 6:
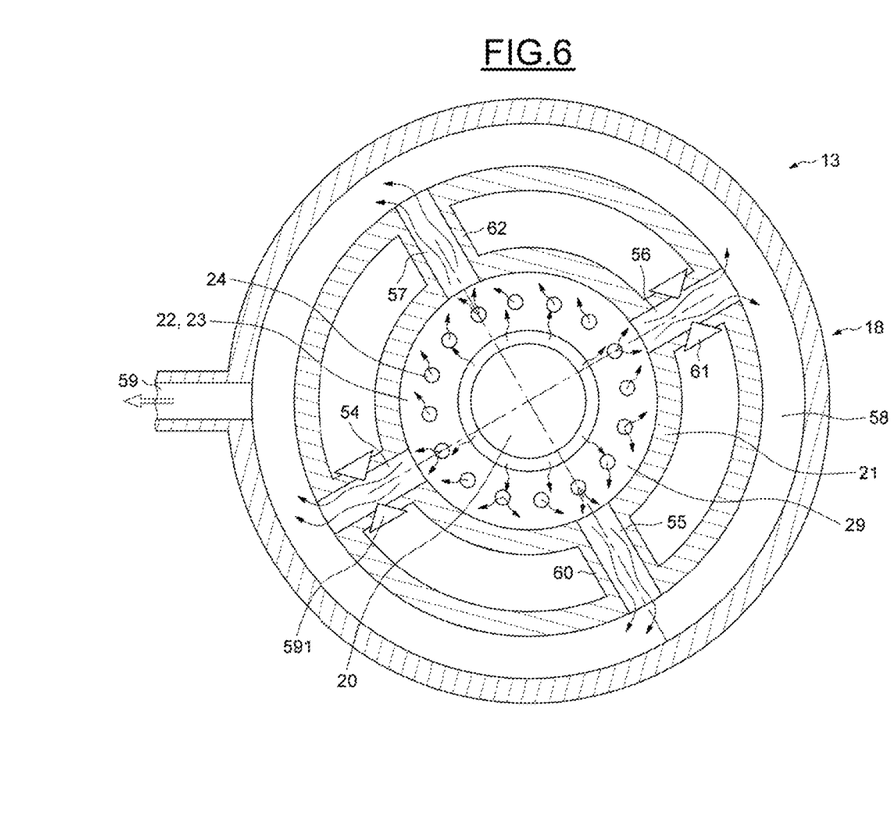
FIG. 6 illustrates a third embodiment of the rotary electric machine.

Reference is made to FIG. 6 that illustrates a radial section in the IV-IV direction of a third embodiment of the rotary electric machine 13.

It shows the stator 18 comprising the stator frame 21, the magnetic mass 22, the longitudinal channels 24, and the rotor 20.

The stator 18 differs from the stator illustrated in FIGS. 3 and 4 in that it comprises four discharge openings 54 to 57 connected to each discharge pipe 29, and a second collecting chamber 58 encompassing the stator frame 21 and collecting the fluid flowing through each opening 54 to 57.

The openings may be of identical or different sections.

The second collecting chamber 58 comprises for example an outlet 59 for discharging the fluid out of the stator.

Alternatively, the second collecting chamber 58 may comprise two outlets or more.

Alternatively, the stator 18 comprises as many second collecting chambers 58 as flow lines such that the openings communicating with a flow line are connected to one of the second collecting chambers 58.

Each opening 54 to 57 is connected to the second collecting chamber 58 via the first regulation means.

For example, first 54 and third 56 openings are connected by control valves 591 and 61 to the second collecting chamber 58, and second 55 and fourth 57 openings are connected to the second collecting chamber 58 via calibrated fluid passage sections 60 and 62.

As described previously, the calibrated sections and the control valves make it possible to modify the distribution of the temperature profile in the magnetic mass.

Figure 7:
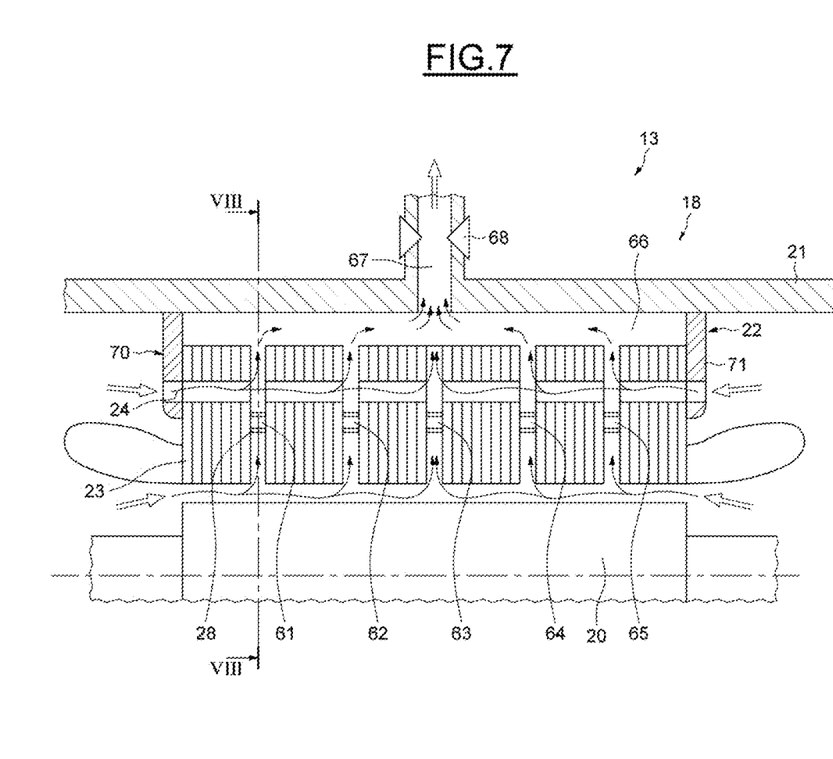
FIGS. 7 and 8 illustrate a fourth embodiment of the rotary electric machine.
Figure 8:
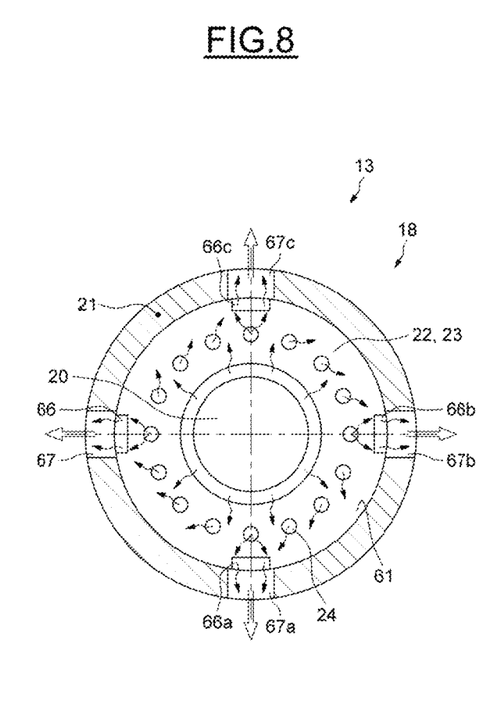

FIGS. 7 and 8 illustrate a longitudinal section and a radial section in the VIII-VIII direction of a fourth embodiment of the rotary electric machine 13.

It shows the stator 18 comprising the magnetic mass 22 including the channels 24, the stator frame 21, the spacers 28, and the rotor 20.

The magnetic sheets 23 and the spacers 28 form five discharge pipes 61 to 65 leading to a longitudinal groove 66 formed by the magnetic sheets.

The groove 66 channels the fluid from the discharge pipes 61 to 65 to an opening 67 comprising for example the first regulation means, such as a control valve 68.

In this embodiment, the magnetic mass includes at each of the ends thereof a clamping plate 70 and 71 maintaining the compacted magnetic sheets, the clamping plates 70 and 71 plugging the ends of the grooves 66 to prevent the fluid from escaping via the ends of the magnetic mass.

In this embodiment, the discharge pipe 61 is connected to four grooves 66, 66a, 66b, 66c each leading to an opening 67, 67a, 67b, 67c.

Alternatively, each pipe leads to at least one groove for discharging the fluid.

According to another alternative, one or more openings may comprise a first identical or different regulation means.

The fluid is injected into the rotary electric machine 13 at a pressure for example greater than 1.2 bar, the fluid being for example a coolant.

The invention claimed is:

1. A stator for rotary electric machine comprising a stator frame and a cylindrical magnetic mass inserted in the stator frame, the magnetic mass including a plurality of stacks of compacted magnetic sheets and longitudinal channels uniformly distributed over at least one diameter of the magnetic mass, the channels leading to each side of the magnetic mass, characterized in that at least three bundles of compacted magnetic sheets are separated by spacers forming two discharge pipes extending circumferentially and radially between the stator frame and a central housing of the stator intended to receive a rotor of the rotary electric machine and communicating with the channels, the stator frame comprising at least two discharge openings connected to different discharge pipes such that a fluid injected on either side of the magnetic mass escapes from the stator via the discharge pipes, a fluid passage section of the discharge pipes being configured to modify a temperature distribution in the magnetic mass, wherein the spacers are of different sizes such that the discharge pipes are of different sizes, each discharge opening being substantially equal to or greater than a section of the discharge pipe connected to said discharge opening.

2. The stator according to claim 1, wherein each discharge pipe is connected to a plurality of discharge openings disposed over a diameter of the stator frame.

3. The stator according to claim 1, wherein a thickness of at least one of the bundles of compacted magnetic sheets is different from a thickness of the other bundles of compacted magnetic sheets.

4. The stator according to claim 1, wherein the magnetic mass further comprises at least one longitudinal groove leading to an outer surface area of the magnetic mass, said groove being configured to channel the fluid from the discharge pipes to the discharge openings.

5. The stator according to claim 1, further comprising at least one manifold having branches connected to different discharge openings disposed in the stator frame, a fluid passage surface area of each branch being substantially equal to or greater than the fluid passage surface area of a discharge opening of the different discharge openings connected to said branch, each branch comprising a first regulation means configured to control a fluid flow rate flowing through said branch and the manifold comprising an outlet for discharging the fluid from the stator.

6. The stator according to claim 1, further comprising at least one first collecting chamber extending in a longitudinal direction and collecting the fluid flowing through each discharge opening disposed along the stator frame, the first collecting chamber comprising an outlet for discharging the fluid out of the stator and a first regulation means configured to control a fluid flow rate circulating through said outlet.

7. The stator according to claim 6, further comprising a second collecting chamber encompassing the stator frame and configured to collect the fluid flowing through each discharge opening, the second collecting chamber comprising at least one outlet for discharging the fluid out of the stator.

8. The stator according to claim 7, wherein each discharge opening is connected to the second collecting chamber via a first regulation means configured to control a fluid flow rate circulating through said discharge opening.

9. The stator according to claim 8, wherein the second collecting chamber comprises at least one second outlet and a second regulation means configured to control a fluid flow rate circulating through the second outlet.

10. The stator according to claim 9, wherein the first regulation means and the second regulation means each comprise a control valve or a fluid passage section calibrated at a predetermined value for a predetermined pressure or a predetermined temperature.

11. A rotary electric machine comprising a stator according to claim 1.

12. A integrated compressor unit comprising a sealed casing comprising a compression section and a rotary electric machine according to claim 11 driving the compression section.

\* \* \* \* \*